Nov. 29, 1955      W. H. ALLAN      2,725,492
DUAL RANGE STRING ACCELEROMETER
Filed April 1, 1953
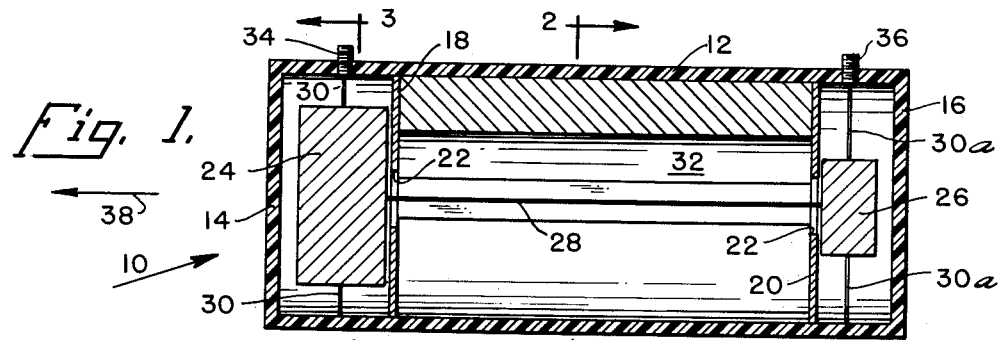
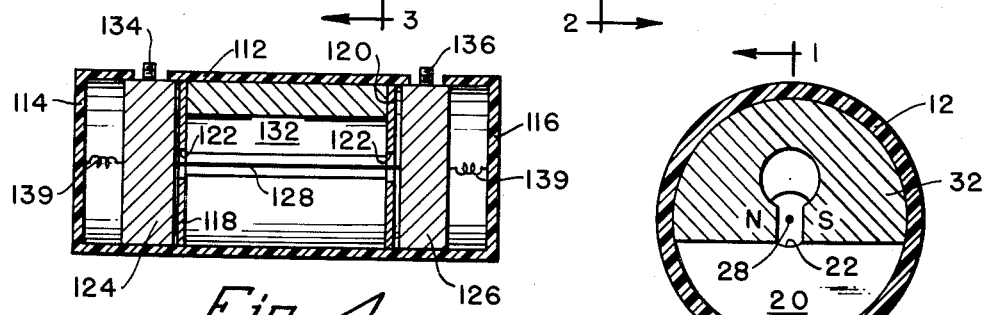
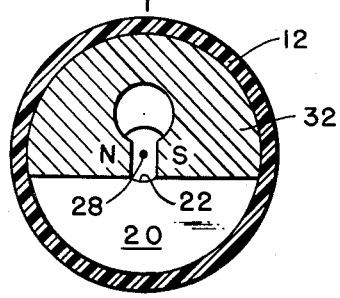
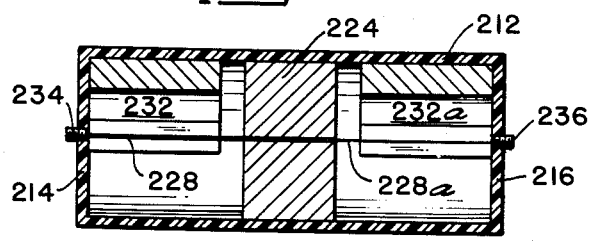
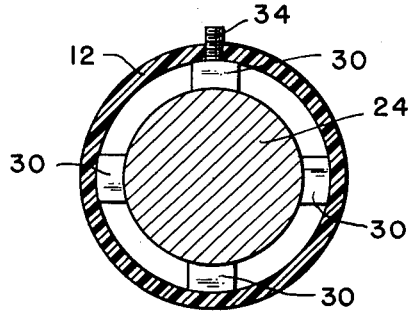
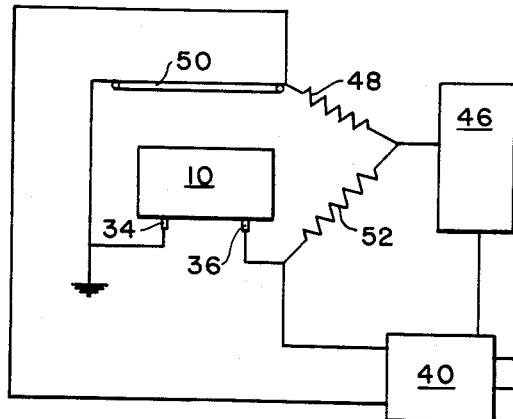
INVENTOR.
WALLACE H. ALLAN
BY
*J. D. O'Brien*
*E. C. Walsh*
ATTORNEYS 2,725,492
Patented Nov. 29, 1955

2,725,492

DUAL RANGE STRING ACCELEROMETER

Wallace H. Allan, China Lake, Calif.

Application April 1, 1953, Serial No. 346,295

11 Claims. (Cl. 310—25)

(Granted under Title 35, U. S. Code (1952), sec. 266)

The invention described herein may be manufactured and used by or for the Government of the United States of America for governmental purposes without the payment of any royalties thereon or therefor.

This invention relates to devices for measuring accelerations, and in particular to an accelerometer capable of measuring both positive and negative accelerations.

In the testing of missiles, and in particular in the testing of rockets, it is frequently desirable to continuously measure the magnitudes of the accelerations to which the missile is subjected during propulsion and to the negative accelerations, or decelerations, to which it is subject during the nonpropulsive, or coasting, stage of the missile flight.

In the past various accelerometers have been used which utilize various different means for measuring accelerations. Fundamentally, they are based upon the reaction of a mass to acceleration. String, or wire, accelerometers have been built in which a mass produces a tension on a wire which tension varies as the acceleration to which the mass is subject varies. Since the frequency of vibration of the wire varies as the square root of the tension, it is therefore possible to calibrate the frequency at which the wire vibrates in terms of the acceleration to which the mass is subjected. However, previous string accelerometers have been suitable for use in measuring an acceleration acting in a single direction. Thus in order to measure the magnitudes of accelerations and decelerations in the direction of flight, it was necessary to mount two accelerometers within the missile. Since space and weight limitations in missiles are critical, it is highly desirable to decrease the weight and space requirements of test equipment to an absolute minimum.

It is therefore an object of this invention to provide a string accelerometer that is capable of continuously measuring accelerations and decelerations.

It is another object of this invention to provide an accelerometer which will continuously measure accelerations of widely different ranges.

It is still a further object of this invention to provide a device which is suitable to measure the accelerations and decelerations of a missile which occupies a minimum of space, and which has a minimum weight.

Other objects and many of the attendant advantages of this invention will be readily appreciated as the same becomes better understood by reference to the following detailed description when considered in connection with the accompanying drawings wherein:

Fig. 1 is a section taken along line 1—1 of Fig. 2;
Fig. 2 is a section taken along line 2—2, Fig. 1;
Fig. 3 is a section taken along line 3—3 of Fig. 1;
Fig. 4 is a longitudinal section of a second embodiment of the invention;
Fig. 5 is a longitudinal section of a third embodiment of the invention, and
Fig. 6 is a schematic illustration of circuit means in which this invention may be incorporated.

In Figs. 1, 2 and 3 there is illustrated one form that the novel dual range string accelerometer may assume. Accelerometer 10 comprises hollow housing, or mounting means, 12 which may, for example, be made from a suitable nonconductor, such as a plastic, and which has end portions 14 and 16. Stops, or abutments, 18 and 20 are located within housing 12. In each of said abutments there is provided an opening 22. Mass 24 is located within housing 12 between end portion 14 and stop 18, while mass 26 is located within housing 12 between end portion 16 and stop 20. Wire 28, which may be made of tungsten, has one of its ends secured to mass 24 while the other end is secured to mass 26. Masses 24 and 26 are supported within housing 12 by means of thin metal strips 30, 30a, respectively, which may be made of phosphor-bronze, spring steel, or the like, and which permit axial movement of the masses within the housing. The length of wire 28 and the positions in which masses 24 and 26 are supported are so adjusted relative to stops 18 and 20 that only a slight movement by one of the masses away from its corresponding stop will cause the other mass to engage its stop. Masses 24 and 26 may be arranged so as to continuously abut stops 18 and 20 resulting in there always being a minimum tension on wire 28.

A permanent magnet 32 is located within housing 12 between stops 18 and 20. Magnet 32 is arranged relative to wire 28 so that said wire extends at least for a part of its length through a substantially constant magnetic field. An electrical circuit is completed from terminal 34 to terminal 36 which are mounted on housing 12 through a conducting strip 30, weight 24, wire 28, weight 26 and a conducting strip 30a.

The device illustrated in Figs. 1–3 is adapted to measure positive or negative accelerations in directions which are substantially parallel to wire 28. For example, if accelerometer 10 is mounted in a rocket which is launched in the direction indicated by arrow 38, thus during the propulsive phase mass 24 will engage stop 18 and mass 26 will exert a force or tension on wire 28 which is directly proportional to the magnitude of the acceleration. The fundamental frequency of oscillation, $f_n$, in cycles per second of wire 28 will then be:

(1) $$f_n = \frac{1}{2L}\sqrt{\frac{Ma}{p}}$$

where L is the length of wire 28 in centimeters,
M is the mass in grams which tension wire 28
$a$ is the acceleration to which M is subjected in cm./sec., and
$p$ is the weight per unit length of wire 28 in grams/centimeter.

Solving equation 1 for acceleration yields:

(2) $$a = \frac{4pL^2(f_n)^2}{M}$$

Since $p$, L, and M are all known constants, acceleration can be calibrated in terms of $f_n$, the frequency of oscillation of wire 28.

The shock of launching the missile in which accelerometer 10 is mounted is sufficient to start wire 28 to oscillating. As wire 28 oscillates in the magnetic field created by permanent magnet 32, an E. M. F., or voltage, will be generated which will appear across terminals 34 and 36. The voltage generated by the oscillation of wire 28 will be of the same frequency as the frequency of oscillation, $f_n$, of wire 28. The oscillation of wire 28 may be sustained at substantially constant amplitude, and the voltage generated by the oscillations of wire 28 may be amplified to useable values by the means illustrated in Fig. 6, as will be explained later.

During the nonpropulsive phase of a missile's flight, aerodynamic drag on the missile will cause it to decelerate.

When this occurs, mass 24 will move away from stop 18, while mass 26 will engage stop 20. The deceleration will act on weight 24 and will produce tension on string, or wire, 28 in the same manner that weight 26 tensioned wire 28 during the propulsive phase. The magnitudes of the decelerations can then be determined from the frequency of oscillation of string, or wire, 28 as was explained above.

In the device illustrated in Figs. 1, 2 and 3 a smaller mass 26 is used to measure the large accelerations occurring during the propulsive phase of the flight, while larger mass 24 is used to measure the smaller decelerations of the nonpropulsive phase. It is, of course, easy to note the time when the missile ceases to accelerate and begins to decelerate for at that time the tension on wire 28 is at a minimum and the frequency of oscillation or wire 28 will also be at a minimum.

A second modification of the invention, illustrated in Fig. 4, has masses 124 and 126 slidably mounted in housing 112. Masses 124 and 126 are located between ends 114 and 116 of housing 112, and stops 118 and 120, respectively. Openings 122 are formed in stops 118, 120 so that wire 128 may be connected between masses 124, 126. Springs 130 are connected between ends 114, 116 of housing 112 and weights 124 and 126 in order that a tension will always be exerted on wire 128. Permanent magnet 132 is mounted within housing 112 between stops 118, 120 to provide a magnetic field through which wire 128 extends. An electrical circuit is provided from terminal 134 which is mounted directly on mass 124 to terminal 136 which is mounted on mass 126 through weight 124, wire 128 and weight 126. The voltage generated by the oscillation of wire 128 in the magnetic field of magnet 132 will appear across terminals 134 and 136.

A third modification of the invention is illustrated in Fig. 5, and comprises a housing 212 in which there is slidably mounted a single mass 224. Wire 228 is connected between end 214 of housing 212 and mass 224. Wire 228a is connected between end 216 and mass 224. Wires 228 and 228a may have an initial tension applied to them, or they may have substantially no tension when mass 224 is not being accelerated in a direction parallel to wires 228 and 228a. Magnet 232 is located in housing 212 between end 214 and weight 224 and arranged so that wire 228 extends through its magnetic field. Magnet 232a is located in housing 212 between weight 224 and end 216 of housing 212 and is so arranged that wire 228a extends through its magnetic field. An electrical circuit exists from terminal 234 mounted in end 214 to terminal 236 mounted in end 216 through wire 228, mass 224, and wire 228a.

Depending upon the direction of acceleration either wire 228 or 228a will be tensioned by mass 224, and the frequency of oscillation of either wire will be a measure of the magnitudes of the accelerations. Since the magnitudes of accelerations during the propulsion stage of a missile's flight are larger and, of course, act in an opposite direction from the accelerations during the nonpropulsive phase, the weight per unit length of wire 228 may be made, for example, less than the weight per unit length of wire 228a in order that the range of frequencies of oscillations of wires 228 and 228a during the two phases of a missile's flight will be of the same order of magnitude.

There is schematically illustrated in Fig. 6, a balanced bridge network adapted to amplify the voltage generated by the dual range string accelerometers described above and to maintain the voltages generated at a substantially constant amplitude. Terminal 34 of accelerometer 10, for example, is connected to ground, and terminal 36 is connected to one of the input terminals of conventional amplifier 40. The voltage generated by accelerometer 10 appears across terminals 34 and 36, is amplified by amplifier 40, and appears across output terminals 42 and 44. A portion of the amplified voltage is applied to a conventional automatic gain control circuit 46. The output of the automatic gain control circuit is then applied across the bridge network, which comprises resistor 48 and thermal balance wire 50, forming two arms of the bridge, and resistor 52 and accelerometer 10, which forms the other two arms of the bridge. Resistors 48 and 52 are equal and the resistance of thermal balance wire 50 equals the resistance of accelerometer 10. The current from the automatic gain control circuit 46 has the proper phase and magnitude to sustain the oscillations of wire 28 of accelerometer 10 at substantially a constant amplitude. The bridge network prevents voltages developed in wire 28 of accelerometer 10 by the current from the automatic gain control circuit from being applied to the amplifier 40. The output of amplifier 40 can, for example, be used to modulate a telemetering system in order that the desired information, the frequency of oscillation of wire 28, may be communicated to a receiver.

Obviously many modifications and variations of the present invention are possible in the light of the above teachings. It is, therefore, to be understood that within the scope of the appended claims the invention may be practiced otherwise than as specifically described.

What is claimed is:

1. A string accelerometer comprising a support, wire means carried by the support, means comprising at least one mass carried by the support and movable relative thereto for tensioning said wire means, means for forming a magnetic field through which said wire means extends, and circuit means connected to said wire means for conducting voltages generated in said wire means to the exterior of said support when said wire means vibrates in said magnetic field.

2. A string accelerometer as claimed in claim 1 including means for amplifying said voltage generated by said wire means and means for sustaining the oscillation of said wire means.

3. A string accelerometer comprising a support, wire means carried by the support so as to extend in substantially a straight line, means comprising at least one mass carried by the support and movable relative thereto for tensioning said wire means when said support is acted upon by accelerations acting in a direction substantially parallel to said wire means, and means forming a permanent magnetic field through which said wire means extends.

4. A strong accelerometer as claimed in claim 3 including circuit means for amplifying voltages generated by oscillations of said wire means in the magnetic field and means for sustaining the oscillation of said wire means.

5. An accelerometer comprising a hollow housing having two ends, a pair of abutment means mounted in said housing, a first mass movably mounted between one end of said housing and one of said abutment means, a second mass movably mounted between said other end of said housing and said second abutment means, said abutment means adapted to prevent said masses from passing thereby, a wire connected between said masses, the length of said wire being such as to prevent said masses from engaging the ends of said housing, said wire extending in substantially a straight line between said masses, means forming a substantially constant magnetic field through which field said wire extends, and circuit means for conducting a voltage generated by the oscillation of said wire in said magnetic field to the exterior of said housing, whereby accelerations parallel to the direction of said wire may be measured.

6. An accelerometer as defined in claim 5 in which there is provided means for amplifying a voltage generated in said wire and means for feeding back a portion of said amplified voltage to sustain the oscillations of said wire at substantially constant amplitude.

7. An accelerometer as defined in claim 5 in which one of the masses is greater than the other.

8. An accelerometer comprising a hollow housing having two ends, a pair of abutment means mounted in said housing, a first mass movably mounted between one end of said housing and one of said abutment means, a second mass movably mounted between said other end of said housing and said second abutment means, said abutment means adapted to prevent said masses from passing thereby, wire means connected between said masses, said wire being slightly longer than the distance between said abutment means but the length of said wire being such as to prevent said first and second masses from engaging the ends of the housing, means forming a substantially constant magnetic field through which field said wire extends, and circuit means for conducting a voltage generated by the oscillation of said wire in said magnetic field to the exterior of said housing, whereby accelerations of the housing substantially parallel to the direction of said wire may be continuously measured.

9. An accelerometer comprising a hollow housing having two ends, a pair of abutment means mounted in said housing, a first mass slidably mounted between one end of said housing and one of said abutment means, a second mass slidably mounted between said other end of said housing and said second abutment, said abutment means preventing said masses from passing thereby, a wire connected between said masses, said wire extending in substantially a straight line between said masses, resilient means connecting at least one of said masses to said housing, the length of said wire being such that the first and second masses do not engage the ends of said housing, means forming a substantially constant magnetic field through which field said wire extends, and an electrical circuit means for conducting a voltage generated by the oscillation of said wire in said field to the exterior of said housing, whereby accelerations of said housing parallel to the direction of said wire may be measured.

10. An accelerometer comprising a hollow housing having two ends, a mass slidably mounted in said housing, a first wire connecting said mass to one of the ends of the housing, a second wire connecting said mass to the other end of the housing, the wires extending in substantially a straight line, means forming a substantially constant magnetic field through which the wires extend, and circuit means for conducting voltages generated by the oscillation of said wires in said magnetic fields to the exterior of said housing.

11. An accelerometer as defined in claim 10, in which one of the wires has a greater mass per unit length than the other said wires.

References Cited in the file of this patent

UNITED STATES PATENTS 2,643,367      Gruzman  ---------------- June 23, 1953